United States Patent [19]
Ostrander et al.

[11] Patent Number: 5,960,977
[45] Date of Patent: Oct. 5, 1999

[54] CORRUGATED POLYMERIC FILLER NECK TUBING

[75] Inventors: James E. Ostrander, Rochester; David A. Bensko, Oscoda; Ricki Kelley, Clarkston; Theodore J. Watson, Sterling Hts.; Gary O. Klinger, Warren, all of Mich.

[73] Assignee: ITT Manufacturing Enterprises, Inc., Wilmington, Del.

[21] Appl. No.: 09/079,092

[22] Filed: May 14, 1998

[51] Int. Cl.$^6$ .............................. F16L 11/12; B65D 25/00
[52] U.S. Cl. .................... 220/86.1; 138/145; 138/153; 138/DIG. 7; 220/86.2
[58] Field of Search .................. 220/86.1, 86.2, 220/86.4; 138/140, 145, 146, 149, 153

[56] References Cited

U.S. PATENT DOCUMENTS

| | | |
|---|---|---|
| 3,070,132 | 12/1962 | Sheridan . |
| 3,166,688 | 1/1965 | Rowand et al. . |
| 3,473,087 | 10/1969 | Slade . |
| 3,506,155 | 4/1970 | Augr .................................. 220/86.2 |
| 3,561,493 | 2/1971 | Maillard et al. . |
| 3,577,935 | 5/1971 | Reinhart et al. . |
| 3,692,889 | 9/1972 | Hetrich . |
| 3,751,541 | 8/1973 | Hegler . |

(List continued on next page.)

FOREIGN PATENT DOCUMENTS

| | | |
|---|---|---|
| 0117669 | 9/1984 | European Pat. Off. . |
| 0164766 | 12/1985 | European Pat. Off. . |
| 0436923 | 7/1991 | European Pat. Off. . |
| 0551094 | 7/1993 | European Pat. Off. . |
| 2114550 | 6/1972 | France . |
| 2577168 | 8/1986 | France . |
| 2577564 | 8/1986 | France . |
| 2579290 | 9/1986 | France . |

(List continued on next page.)

OTHER PUBLICATIONS

ATOCHEM, *Safety Data Sheet*.
James M. Margolis, *Conductive Polymers and Plastics*, ch. 4, pp. 119–124 (Chapman & Hall, New York).
Central Glass Co., Ltd., *Flexible Fluoroplastic CEFRAL Soft*, pp. 1–20.
Kirk–Othmer, *Encyclopedia of Chemical Technology*, 3d ed., vol. 18, pp. 406–425 (John Wiley & Sons, New York) (1982).
Shell Chemical Company, *Kraton—Compounds Properties Guide*.
Shell Chemical Company, *Kraton Thermoplastic Rubber—Processing & Fabricating Kraton Thermoplastic Rubber Compounds*, pp. 1–26 (Apr. 1988).

(List continued on next page.)

*Primary Examiner*—Joseph M. Moy
*Attorney, Agent, or Firm*—Robert P. Seitter

[57] ABSTRACT

A polymeric, multiple-layer tube suitable for use as a filler neck is disclosed. The tube is comprised of a generally cylindrical wall having an outer surface and an inner surface. The inner surface is approximately parallel to the outer surface and defines a generally cylindrical interior having a diameter D. The cylindrical interior, which provides a flow path for fuel, extends throughout the length of the tube. The tube is divided into one or more contiguous first and second longitudinal segments. In the first longitudinal segment, D is approximately constant along the length of the segment; in the second longitudinal segment, D varies with axial position. This variation defines a convolution, which allows the filler tube to be bent without crimping. The cylindrical wall of the multiple-layer tube further comprises an outer layer composed of a thermoplastic elastomer, and an inner layer composed of an extrudable melt-processible thermoplastic having an elongation of at least 150%. Though in contact, the two layers are not bonded together. When compounded with suitable additives, the filler neck tube exhibits good abrasion resistance, is nearly impermeable to hydrocarbons present in fuel, and is less susceptible to electrostatic discharge.

25 Claims, 1 Drawing Sheet

U.S. PATENT DOCUMENTS

| | | |
|---|---|---|
| 3,828,112 | 8/1974 | Johansen et al. . |
| 3,838,713 | 10/1974 | Tubbs ..................................... 220/86.2 |
| 3,907,955 | 9/1975 | Viennot . |
| 4,059,847 | 11/1977 | Phillips et al. . |
| 4,136,143 | 1/1979 | Lupke et al. . |
| 4,243,724 | 1/1981 | Strutzel et al. . |
| 4,244,914 | 1/1981 | Ranalli et al. . |
| 4,272,585 | 6/1981 | Strassel . |
| 4,273,798 | 6/1981 | Scheiber . |
| 4,303,457 | 12/1981 | Johansen et al. . |
| 4,330,017 | 5/1982 | Satoh et al. . |
| 4,424,834 | 1/1984 | Sumi et al. . |
| 4,448,748 | 5/1984 | Radtke et al. . |
| 4,614,208 | 9/1986 | Skarelius . |
| 4,659,625 | 4/1987 | Decroly et al. . |
| 4,675,780 | 6/1987 | Barnes et al. . |
| 4,685,090 | 8/1987 | Krevor . |
| 4,706,713 | 11/1987 | Sadamitsu et al. . |
| 4,710,337 | 12/1987 | Nordstrom . |
| 4,762,589 | 8/1988 | Akiyama et al. . |
| 4,800,109 | 1/1989 | Washizu . |
| 4,853,297 | 8/1989 | Takahashi et al. . |
| 4,880,036 | 11/1989 | Kitami et al. . |
| 4,887,647 | 12/1989 | Igarashi et al. . |
| 4,907,625 | 3/1990 | Ito et al. . |
| 4,907,830 | 3/1990 | Sasa et al. . |
| 4,944,972 | 7/1990 | Blembereg . |
| 4,948,643 | 8/1990 | Mueller . |
| 4,984,604 | 1/1991 | Nishimura . |
| 4,990,383 | 2/1991 | Bergstrom et al. . |
| 5,019,309 | 5/1991 | Brunnhofer . |
| 5,038,833 | 8/1991 | Brunnhofer . |
| 5,076,329 | 12/1991 | Brunnhofer . |
| 5,080,405 | 1/1992 | Sasa et al. . |
| 5,112,692 | 5/1992 | Strassel et al. . |
| 5,129,429 | 7/1992 | Winter et al. . |
| 5,141,427 | 8/1992 | Hegler et al. . |
| 5,142,782 | 9/1992 | Martucci . |
| 5,143,122 | 9/1992 | Adkins . |
| 5,148,837 | 9/1992 | Agren et al. . |
| 5,167,259 | 12/1992 | Brunnhofer . |
| 5,170,011 | 12/1992 | Martucci . |
| 5,219,002 | 6/1993 | Stenger et al. . |
| 5,219,003 | 6/1993 | Kerschbaumer . |
| 5,258,213 | 11/1993 | Mugge et al. . |
| 5,284,184 | 2/1994 | Noone et al. . |
| 5,373,870 | 12/1994 | Derroire et al. . |
| 5,380,385 | 1/1995 | Derroire et al. . |
| 5,383,087 | 1/1995 | Noone et al. . |
| 5,390,808 | 2/1995 | Choma et al. . |
| 5,425,817 | 6/1995 | Mugge et al. . |
| 5,437,311 | 8/1995 | Reynolds . |
| 5,460,771 | 10/1995 | Mitchell et al. . |
| 5,469,892 | 11/1995 | Noone et al. . |
| 5,524,673 | 6/1996 | Noone et al. . |
| 5,538,039 | 7/1996 | Hande et al. ............................ 220/86.2 |
| 5,560,398 | 10/1996 | Pfleger . |
| 5,566,720 | 10/1996 | Cheney et al. . |
| 5,570,711 | 11/1996 | Walsh . |
| 5,653,266 | 8/1997 | Reynolds et al. . |

FOREIGN PATENT DOCUMENTS

| | | |
|---|---|---|
| 2688858 | 9/1993 | France . |
| 1779905 | 2/1972 | Germany . |
| 2906317 | 8/1979 | Germany . |
| 3821723 | 9/1989 | Germany . |
| 3827092 | 9/1989 | Germany . |
| 9001467 | 4/1990 | Germany . |
| 4001125 | 12/1990 | Germany . |
| 4001126 | 12/1990 | Germany . |
| 9007303 | 12/1990 | Germany . |
| 3942354 | 6/1991 | Germany . |
| 4006870 | 7/1991 | Germany . |
| 4025301 | 4/1992 | Germany . |
| 4137430 | 5/1993 | Germany . |
| 4214383 | 9/1993 | Germany . |
| 9400522 | 1/1994 | Germany . |
| 9319879 | 4/1994 | Germany . |
| 9402180 | 5/1994 | Germany . |
| 46-9667 | 3/1971 | Japan . |
| 55-97933 | 7/1980 | Japan . |
| 60-32627 | 2/1985 | Japan . |
| 2204376 | 11/1988 | United Kingdom . |
| 2211266 | 6/1989 | United Kingdom . |
| 93/25835 | 12/1993 | WIPO . |
| 94/07673 | 4/1994 | WIPO . |
| 94/09302 | 4/1994 | WIPO . |
| 94/09303 | 4/1994 | WIPO . |
| 95/21051 | 8/1995 | WIPO . |
| 95/27866 | 10/1995 | WIPO . |
| 95/30105 | 11/1995 | WIPO . |
| 97/44186 | 11/1997 | WIPO . |

OTHER PUBLICATIONS

Shell Chemical Company, *Kraton Rubber Automotive Compound Characteristics.*

Shell Chemical Company, *Kraton Thermoplastic Rubber—Typical Properties 1990*, pp. 1–11 (Feb. 1990).

Advanced Elastomer Systems, *Material Safety Data—Santoprene Thermoplastic Rubber FR Grades*, pp. 1–5 (Dec. 1, 1990).

Central Glass Co., Ltd., *Material Safety Data Sheet—XUA-2U*, pp. 1–2 (Mar. 18, 1991).

Shell Chemical Company, *Material Safety Data Sheet*, pp. 1, 3, 5 (Aug. 10, 1990).

SAE Standard, *Nonmetallic Air Brake System Tubing—SAE J844*, pp. 203–208 (Jun. 1990).

International Plastics Selector, *Plastics Digest—Thermoplastics and Thermosets*, ed. 14, vol. 2, pp. 216–219, 1283–1284 (1993).

EMS—American Grilon Inc., *EMS Engineering Polymers—Product Data Bulletin—GRILAMID L25FVS40—GRILAMID L25F10.*

Huls America Inc., *Product Information—Vestamid Nylon 12.*

Donald V. Rosato, David P. Di Mattia, & Dominick V. Rosato, *Designing with Plastic & Composites: A Handbook*, pp. 210–223 (Van Nostrand Reinhold, New York) (1991).

Advanced Elastomer Systems, *Santoprene Thermoplastic Rubber—Product Data Sheet—251-80* (Nov. 1991).

Advanced Elastomer Systems, *Santoprene Thermoplastic Rubber—Fluid Resistance*, pp. 1–12 (1992).

DSM Thermoplastic Elastomers Inc., *Sarlink 1000 Series—Material Safety Data Sheet*, pp. 1–4 (Jan 14, 1992).

Novacor Chemicals Inc., *Sarlink Thermoplastic Elastomers—The Alternative TPEs.*

Novacor Chemicals Inc., *Data Sheet—Sarlink 1570—Fuel Resistant Thermoplastic Elastomer for Marine Hose Applications* (data sheets for other products included) (Nov. 1989).

ASTM, *Standard Specifications for Zinc—5 Aluminum—Mischmetal Alloy (UNS Z38510) in Ingot Form for Hot–Dip Coatings*, pp. 669–670.

State of California—Air Resources Board, *Public Hearing to Consider Amendments . . . Regarding Evaporative Emissions Standards . . .*, pp. 1–2, A1–A4, B1–B43 (Aug. 9, 1990).

DuPont Corporation, *Tefzel Fluoropolymer—Safety in Handling and Use*, pp. 1–3, 20–21, 35–37.

Vichem Corporation, *Vinyl Compounds—Material Safety Data Sheet—V220–85E–7261* (May 1990).

ASTM, *Designation: D 256—93a—Standard Test Methods for Determining the Pendulum Impact Resistance of Notched Specimens of Plastics*, pp. 1–8 (1993).

Joseph E. Shigley & Larry D. Mitchell, *Mechanical Engineering Design*, p. 177, 4th ed. (McGraw–Hill Book Company, New York) (1983).

Kenneth Wark, *Thermodynamics*, p. 15, 4th ed. (McGraw–Hill Book Company, New York) (1983).

Eugene A. Avallone & Theodore Baumeister III, *Marks' Standard Handbook for Mechanical Engineers*, pp. 1–24, 9th ed. (McGraw–Hill Book Company, New York) (1978).

ICI Americas Inc.—LNP Engineering Plastics, *A Guide to Statically Conductive Advanced Material Composites—Bulletin 223–889*.

CORRUGATED POLYMERIC FILLER NECK TUBING

BACKGROUND

1. Field of the Invention

The present invention relates to multiple-layer polymeric tubing, and more particularly, to a filler neck made from such tubing.

2. Discussion

Filler necks provide a flow path between a motor vehicle's fuel tank and an external fuel source. Originally, filler necks were constructed from metal tubes that were attached to the fuel tank by brazing. Later, brazing was replaced by the use of mechanical connectors. More recently, manufacturers have introduced filler necks made from tubes comprised of one or more polymeric layers. Although conventional polymeric filler necks exhibit certain advantages over metallic filler necks—including weight reduction, improved stability during collisions, and cost savings—they are not without problems.

For example, a filler neck must often be bent at points along its length to conform to unique space requirements in a particular motor vehicle. Bending the filler neck may, depending on the severity of the bend angle, the rigidity of the polymer, and the hoop strength of the tube, produce kinks that obstruct fuel flow. Although kinks can often be avoided by heating the filler neck and supporting it along the bend radius during a bending operation, such procedures are time consuming and require additional equipment such as bending fixtures and ovens.

Although polymeric materials used in current filler neck designs perform satisfactorily, improvements are needed. Most non-metallic filler necks are made from polyamides, including Nylon 6, Nylon 6.6, Nylon 11 and Nylon 12. There are many reasons for their widespread use: polyamides resist attack by fuels and fuel additives, are easily and quickly processed, are recyclable, and are available in standard, uniform grades. However, polyamides, and filler neck tubes made entirely from one or more polyamide layers, provide less flame retardancy and abrasion resistance than other melt processible polymers.

Furthermore, filler neck tubing made entirely of polyamides may not meet stringent air pollution standards. It is anticipated that future Federal and state regulations will limit permissible hydrocarbon emissions due to permeation through fuel lines, vapor recovery hoses, and filler neck tubing. For example, regulations that will be enacted in California fix the total passive hydrocarbon emission for a motor vehicle at 2 $g/m^2$ per 24 hour period as calculated by evaporative emission testing methods such as those described in Title 13 of the California Code of Regulations, section 1976, proposed amendment of Sep. 26, 1991. To achieve the desired total vehicle emission levels, a hydrocarbon permeation level equal to or below 0.5 $g/m^2$ per 24 hour period would be required.

Finally, filler necks made of polymeric materials are susceptible to degradation by electrostatic discharge. Because polymeric materials are generally poor electrical conductors, fuel flowing through the polymeric filler tube imparts an electric charge to the filler neck. The electric charge accumulates on the filler tube until it is large enough to discharge into a nearby electrical conductor. This charge is repeatedly replenished with the passage of additional fuel through the tube. The electrostatic discharge repeatedly occurs in a localized area, gradually eroding the area and leading to rupture of the tubing.

The present invention is directed to overcoming, or at least minimizing, one or more of the problems recited above.

SUMMARY OF THE INVENTION

In accordance with one aspect of the present invention, there is provided a tube suitable for use as a filler neck. The tube is comprised of a generally cylindrical wall having an outer surface and an inner surface. The inner surface is approximately parallel to the outer surface and defines a generally cylindrical interior having a diameter D. The cylindrical interior, which provides a flow path for fuel, extends throughout the length of the tube. The tube can be divided into first and second longitudinal segments. In the first longitudinal segment, D is approximately constant along the length of the segment; in the second longitudinal segment, D varies with axial position. This variation defines a convolution, which allows the filler tube to be bent without crimping. The cylindrical wall of the multiple-layer tube further comprises an outer layer composed of a thermoplastic elastomer, and an inner layer composed of an extrudable melt-processible thermoplastic having an elongation of at least 150%. Though in contact, the two layers are not bonded together.

In accordance with a second aspect of the present invention, there is provided a filler neck comprised of an elongated and generally cylindrical filler tube, and a connector for attaching an end of the filler tube to a motor vehicle fuel tank. The filler tube is composed of a generally cylindrical wall having an outer surface and an inner surface; the inner surface is approximately parallel to the outer surface and defines a generally cylindrical interior having a diameter D. The cylindrical interior extends longitudinally through the tube, and is coaxial to a longitudinal axis. The filler tube includes a first longitudinal segment, in which D is approximately constant along the longitudinal axis, and a second longitudinal segment in which D varies with axial position. The maximum value of D within the second longitudinal segment is between about 20% and about 300% greater than the value of D in the first longitudinal segment. The variation of D defines a convolution that aids in bending the filler tube to the desired shape. The cylindrical wall of the multiple-layer tube further comprises an outer and an inner layer in non-adhesive contact. The outer layer is composed of a thermoplastic elastomer, and the inner layer is composed of an extrudable melt-processible thermoplastic having an elongation of at least 150%.

In accordance with a third aspect of the present invention, there is provided a filler neck comprised of an elongated and generally cylindrical filler tube, and a connector for attaching an end of the filler tube to a motor vehicle fuel tank. The filler tube is composed of a generally cylindrical wall having an outer surface and an inner surface; the inner surface is approximately parallel to the outer surface and defines a generally cylindrical interior having a diameter D. The cylindrical interior extends longitudinally through the tube, and is coaxial to a longitudinal axis. The filler tube includes a first longitudinal segment, in which D is approximately constant along the longitudinal axis, and a second longitudinal segment in which D varies with axial position. The maximum value of D within the second longitudinal segment is between about 20% and about 300% greater than the value of D in the first longitudinal segment. The variation of D defines a convolution that aids in bending the filler tube to the desired shape. The cylindrical wall of the multiple-layer tube further comprises an outer layer in non-adhesive contact with an inner layer. The outer layer is composed of a crosslinked EPDM rubber dispersed in polypropylene, and the inner layer is composed of an extrudable melt-processible thermoplastic. The thermoplastic is a twelve-carbon block polyamide, an eleven-carbon block polyamide, or a six-carbon block polyamide, either alone or in combination.

BRIEF DESCRIPTION OF THE DRAWINGS

The foregoing and other advantages of the present invention will become apparent upon reading the following detailed description and upon reference to the drawings in which.

DETAILED DESCRIPTION OF THE PREFERRED EMBODIMENTS

Figure 1:
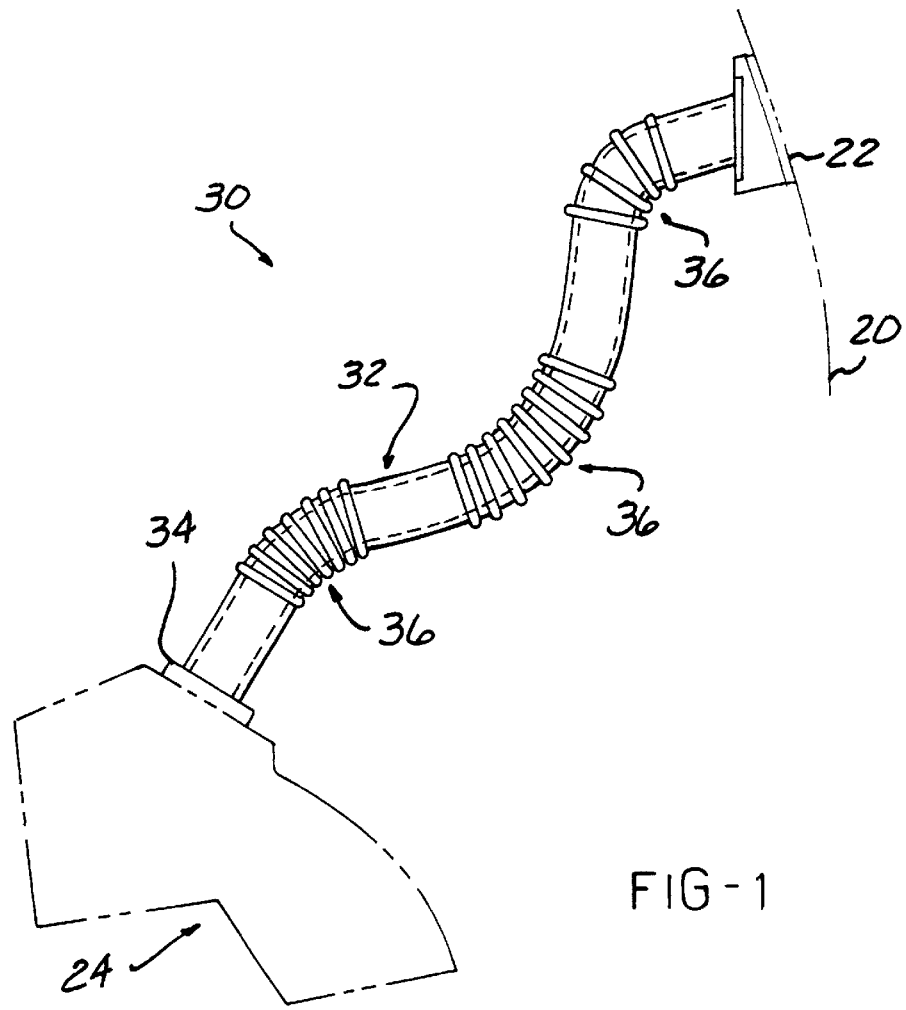
FIG. 1 shows placement of a filler neck of the present invention in a motor vehicle.

FIG. 1 shows a portion of a motor vehicle 20 having a fuel inlet 22 and a fuel tank 24. A filler neck 30 provides a flow path between the fuel inlet 22 and the fuel tank 24. The filler neck 30 is comprised of a filler tube 32 fitted with a connector 34 for attaching the filler tube 32 to the fuel tank 24. The filler tube 32 has a series of bends 36 that allow the filler tube 32 to be routed around several projecting parts (not shown).

Figure 2:
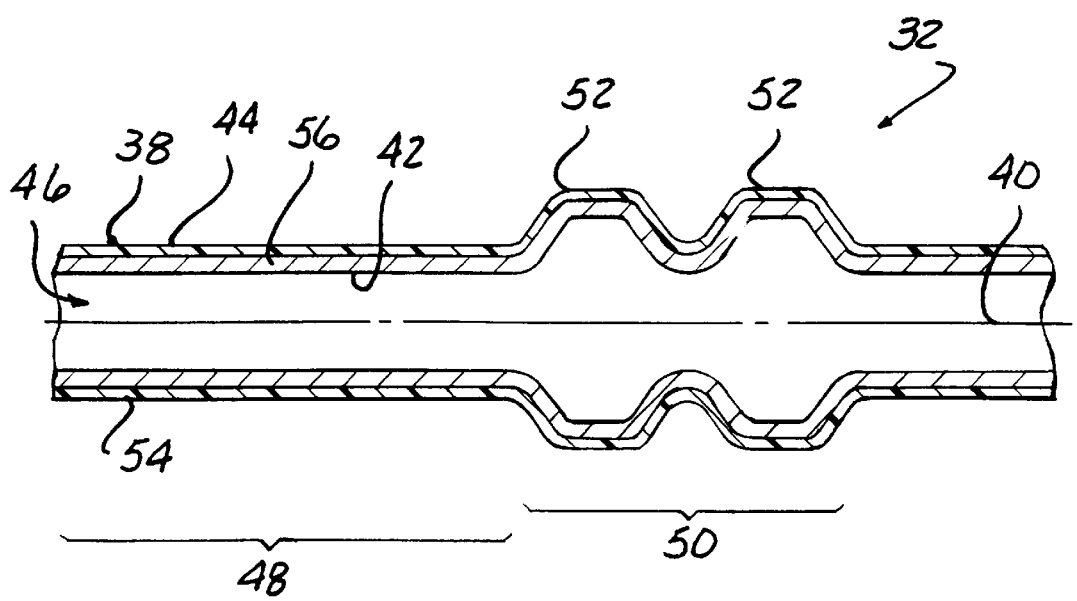
FIG. 2 shows a cross-sectional view of a filler neck tube of the present invention.

FIG. 2 shows a cross-sectional view of the filler tube 32. The filler tube 32 is composed of an elongated, generally cylindrical wall 38 having an approximately circular cross-section perpendicular to its longitudinal axis 40. The cylindrical wall 38 has a generally uniform wall thickness throughout its length and circumference and is defined by an inner surface 42 and an opposed outer surface 44. The inner surface 42 defines a generally cylindrical interior volume 46 having a diameter D that extends longitudinally through the filler tube 32 essentially coaxial to the longitudinal axis 40.

The filler tube 32 comprises at least two distinct longitudinal segments. The filler tube 32 has a first longitudinal segment 48 in which the value of D does not vary with position along the longitudinal axis 40. Contiguous to the first longitudinal segment 48 is a second longitudinal segment 50 that is defined by at least one convolution or corrugation 52 in the cylindrical wall 38. As used herein, the term convolution is defined as a region of cylindrical wall 38 that deviates from parallel to the longitudinal axis 40, and preferably deviates outward from a position parallel to the longitudinal axis 40. This deviation can result in a value of D that, at its maximum, is between about 20% and 300% greater than the diameter of the first longitudinal segment 48. Preferably, the greatest value of D within the second longitudinal region 50, is between 20% and 100% greater than the inner diameter of the first longitudinal segment 48.

The filler tube 32 of the present invention can have as many convolutions with any length of cylindrical tubing optionally interposed therebetween as necessary to achieve the requisite degree of flexibility. The geometry of the convolutions can be of any cross-sectional profile desired. Thus the convolutions 52 can have angled, squared, or sinusoidal profiles as desired. Sufficient convolutions can be placed along the length of the filler tube 32 to accommodate bends of over 90°.

When creating a bend in the filler tube 32, the convolutions 52 along the outer radius of the bend tend to expand or stretch; the convolutions along the inner radius of the bend compress and are brought into lateral contact with one another. In this way, the filler tube 32 does not kink or crimp, as would occur if the convolutions were not present.

The filler tube 32 can be customized to suit the end user. For example, where few bends are required or where bends are at oblique angles, the filler tube 32 can have fewer or shallower convolutions. Conversely, a standardized filler tube 32 can be made having several, regularly spaced apart first 48 and second longitudinal segments 50. Such filler tubes could be used on several different types of motor vehicles.

The filler tube 32 can either be coextruded to a suitable length or can be coextruded in continuous length and cut to fit the given application. The filler tube 32 can have an outer diameter up to about 50 mm, but typically has an outer diameter of about 25 mm. A wall thickness between 0.5 mm and 5.0 mm is generally used, though a wall thickness of approximately 1.5 to 4.0 mm is preferred. While it is within the scope of this invention to prepare tubing having two polymeric layers, more than two polymeric layers can be used depending on the application.

As shown in FIG. 2, the filler tube 32 is comprised of an outer layer 54 disposed on an inner layer 56. The outer layer 54 is composed of a melt processible thermoplastic elastomer (TPE). TPEs can be molded or extruded on standard plastics-processing equipment, and are made by copolymerizing two or more monomers, using either block or graft polymerization. One of the monomers develops a hard, or crystalline segment that functions as a thermally stable component that can soften and flow under shear—at service temperatures, the hard segment provides mechanical strength and toughness. The other monomer develops a soft, or amorphous segment, that provides elasticity. Through the addition of flame retardants, TPEs offer greater flame resistance and abrasion resistance than traditional thermoplastics such as polyamides.

Generally, the outer layer 54 should not react with the external environment and should be able to withstand various shocks, vibrational fatigue, and changes in temperature as well as exposure to various corrosive compounds present in motor vehicles. Furthermore, the outer layer 54 should be usable within a temperature range between about −40° C. and about 150° C., or preferably, within a range of between about −20° C. and about 120° C. The filler tube 32 should have a tensile strength of no less than 25 N/mm$^2$, elongation at break of at least 150%, and a burst strength at 23° C. and 120° C. of at least 20 bar.

Suitable TPEs include polyurethanes, polyester copolymers, styrene copolymers, olefinic thermoplastic elastomers, melt processible rubbers and thermoplastic vulcanizates. Polyurethanes result from reacting a multifunctional isocyanate with polyether, polyester, or caprolactone glycols. Copolyesters are generally tougher over a wider temperature range than urethanes, and are more easily processed. They are commercially available under a variety of trade names including HYTREL from DuPont, RITE-FLEX from Hoechst-Celanese, ECDEL from Eastman Chemical, and LOMOD from General Electric Plastics. Styrene copolymers are block copolymers produced with hard polystyrene segments interconnected with soft segments of a matrix such as polybutadiene, polyisoprene, ethylene-propylene, or ethylene-butylene. Several molding an extrusion grades are available under the trade name KRATON from Shell. Olefinic thermoplastic elastomers are based on polyolefins. They are available in several grades and have the lowest specific gravity of all TPEs.

Melt processible rubbers (MPRs) and thermoplastic vulcanizates (TPVs) are generally classified as elastomeric alloys. This class of TPEs consists of mixtures of two or more polymers that are treated to give properties superior to simple blends having the same constituents. Thermoplastic vulcanizates are a fine dispersion of highly vulcanized or crosslinked rubber in a continuous phase of a polyolefin, and are available under the trade names SANTOPRENE and GEOLAST from Advanced Elastomer Systems. In contrast to dual-phase TPVs, melt processible rubbers are single-phase materials—plasticized alloys of partially crosslinked ethylene interpolymers and chlorinated polyolefins—and are available from DuPont under the trade name ALCRYN.

Because of its low cost-to-performance ratio, SANTOPRENE, which is a fine dispersion of ethylene propylene diene terpolymer (EPDM) rubber in polypropylene, is especially useful as the outer layer 54. When using SANTOPRENE, the outer layer 54 has a thickness between about 0.5 mm and 1.5 mm.

The inner layer 56 is composed of a melt processible thermoplastic that is resistant to extreme changes in temperature and exposure to chemicals such as those found in engine oil and brake fluid. The preferred material will have a room temperature elongation at break of at least 150%. The thermoplastic material is, preferably, a polyamide selected from the group consisting of 12 carbon block polyamides, 11 carbon block polyamides, as well as zinc chloride resistant 6 carbon block polyamides. Suitable polyamides therefore include Nylon 12, and a polyamide derived from the condensation polymerization of caprolactam, which is commonly referred to as Nylon 6. The 6-carbon block polyamides employed herein may contain sufficient quantities of modifying agents to impart a level of zinc chloride resistance greater than or equal to that required by test method SAE J844: i.e. non-reactivity after 200 hour immersion in a 50% by weight aqueous zinc chloride solution.

The thermoplastic employed in the inner layer 56 can include plasticizers. In the preferred embodiment, the polyamide will contain up to 17% by weight plasticizer; with amounts between about 1% and about 13% being preferred.

If a 6-carbon block polyamide material is employed, it is generally part of a multi-component system comprised of a Nylon-6 copolymer blended with other Nylons and olefinic compounds. The 6-carbon block polyamide material is preferably resistant to zinc chloride and has a melt temperature between about 220° C. and 240° C. Examples of thermoplastic materials suitable for use in the filler tube 32 are propriety materials which can be obtained commercially under the trade names M-7551 from NYCOA Corporation and ALLIED 1779 from Allied Chemical.

In instances where the 6-carbon block polyamide material includes plasticizing agents, these materials are generally present in amounts between about 1.0% and about 13% by total weight of the thermoplastic composition.

Alternatively, the inner layer 56 can be composed of a thermoplastic fluoropolymer. Suitable fluoropolymers include polyvinylidine fluoride, polyvinylfluoride, polychlorotrifluoroethylene, and ethylene tetrafluoroethylene copolymers, either alone or in combination. An especially useful thermoplastic fluoropolymer is a polyvinylidine derived from the thermal dehalogenation of chlorodifluoroethane. The polyvinylidine is commercially available under the trade names FLORAFLON and KYNAR from Atochem Inc. elf Aquitaine Group. Another useful thermoplastic fluoropolymer is an ethylene tetrafluoroethylene copolymer, which is derived from the copolymerization of ethylene with tetrafluoroethylene. It has an ethylene-derived content between about 40% and about 70% and a tetrafluorethylene content between about 30% and about 40% by total polymer weight. It is commercially available under the trade names TEFZEL 210, TEFZEL 200, and TEFZEL 280 from DuPont.

The inner layer 56 should have a thickness sufficient to supply strength and chemical resistance to the filler tube 32. Specifically, the inner layer 56 should be of sufficient thickness to impede permeation of aliphatic and aromatic hydrocarbon molecules and migration of those molecules through to the outer layer 54.

In one embodiment, the outer layer 54 is composed of SANTOPRENE and the inner layer 56 is composed of Nylon 12. In that case, the outer layer 54 is between about 0.5 and 1.5 mm thick, and the inner layer 56 is between about 1.0 mm and 3.0 mm thick.

The inner layer 56 may also, optionally, contain suitable material in sufficient quantity to suppress electrostatic discharge. When used, the material is preferably capable of dissipating electrostatic charges in the range of $10^4$ to $10^9$ Ohm/cm$^2$. The thermoplastic material employed in the present invention may include, in its composition, a conductive media in sufficient quantity to permit electrostatic dissipation in the defined range. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black." Carbon black can be present in the form of carbon fibers, powders, spheres, and the like.

The amount of conductive material contained in the thermoplastic is generally limited to about 5% by volume. At concentrations greater than that, low temperature durability and resistance to fuel degradation are unacceptable.

The conductive material can be either blended into the crystalline structure of the polymer or can be incorporated during the polymerization of monomers which make up the thermoplastic. Without being bound to any theory, it is believed that carbon-containing materials such as carbon black may be incorporated during polymerization of the surrounding thermoplastic material. Materials such as stainless steel are more likely to be blended into the crystalline structure of the polymer.

The filler tube 32 is fabricated by coextruding the outer layer 54 and the inner layer 56. The first longitudinal section 48 and the second longitudinal section 50, can be formed by a technique described in U.S. Pat. No. 5,460,771, which is herein incorporated by reference. In that method, extruded tubular material is introduced into a suitable molding device upon exiting a coextrusion head. The molding device comprises a plurality of segmented dies each having an upper half and a lower half movably positioned on a reciprocal rotational means such as caterpillar tracks. The respective segmented die halves are positioned in a sequential fashion to form an elongated internal die cavity. Depressions are selectively provided in certain die halves to create convolutions 52. Other die-halves have no depressions, which create smooth outer surfaces 44.

In an alternative fabrication method, the inner layer 56 and outer layer 54 are formed in separate steps. The thermoplastic inner layer 56 is extruded and immediately sent to the molding device disclosed above for creating the first 48 and second 50 longitudinal sections. Next, the tube is cooled in a water bath, and then sent to a cross-head die where the thermoplastic elastomer outer layer 54 is applied. This process is less desirable than the coextrusion method since it requires additional equipment, and because the corrugations 52 in the outer layer 54 are less well defined: the "valleys" between adjacent "peaks" in the corrugations 52 tend to fill in with thermoplastic elastomer.

Even when the outer layer 54 and the inner layer 56 are coextruded, the two layers are not bonded together. Instead, the convolutions 52 impressed on the cylindrical wall 38 prevent the two layers from slipping past one another. This results in significant cost savings over conventional polymeric tubes, which require the use of adhesives or additional bonding layers to laminate the inner 56 and outer 54 layers.

Preferred embodiments of the present invention have been disclosed. A person of ordinary skill in the art will realize that certain modifications come within the teachings of this invention. Therefore, one should study the following claims to determine the true scope and content of the invention.

What is claimed is:

1. A tube suitable for use as a filler neck comprising:
   a generally cylindrical wall having an outer surface and an inner surface, the inner surface approximately parallel to the outer surface and defining a generally cylindrical interior having a diameter D, the cylindrical interior extending longitudinally through the tube coaxial to a longitudinal axis;
   a first longitudinal segment in which D is approximately constant along the longitudinal axis; and
   a second longitudinal segment in which D varies with position along the longitudinal axis, the variation of D defining a convolution for facilitating bending of the filler tube, the cylindrical wall of the multiple-layer tube further comprising:
      an outer layer comprised of a thermoplastic elastomer; and
      an inner layer comprised of an extrudable melt-processible thermoplastic having an elongation of at least 150%;
      wherein the outer layer and the inner layer are in non-adhesive contact.

2. The tube of claim 1 wherein the maximum value of D in the second longitudinal segment is between about 20% and about 300% greater than the value of D in the first longitudinal segment.

3. The tube of claim 2 wherein the maximum value of D in the second longitudinal segment is between about 20% and about 100% greater than the value of D in the first longitudinal segment.

4. The tube of claim 2 wherein the convolution has one of an angled, squared and sinusoidal longitudinal cross-sectional profile.

5. The tube of claim 1 wherein the inner layer further comprises a conductive media in an amount sufficient to provide an electrostatic dissipation capacity between about $10^4$ to $10^9$ Ohm/cm$^2$.

6. The tube of claim 1 in which the inner layer further comprises a conductive material in an amount sufficient to provide an electrostatic dissipation capacity between about $10^4$ to $10^9$ Ohm/cm$^2$, wherein the conductive material is elemental carbon, copper, silver, gold, nickel, or silicon, alone or in combination.

7. The tube of claim 6 wherein the conductive material is present in an amount less than about 5% by volume of the inner layer.

8. The tube of claim 6 wherein the conductive material is dispersed in the inner layer.

9. The tube of claim 6 wherein the conductive material is elemental carbon and is incorporated during polymerization of monomers that comprise the thermoplastic.

10. The tube of claim 1 wherein the thermoplastic elastomer is a polyurethane, polyester copolymer, styrene copolymer, olefinic thermoplastic elastomer, a melt processible rubber or a thermoplastic vulcanizate, alone or in combination.

11. The tube of claim 10 wherein the thermoplastic vulcanizate is crosslinked EPDM rubber dispersed in polypropylene.

12. The tube of claim 1 wherein the thermoplastic is a twelve-carbon block polyamide, an eleven-carbon block polyamide, or a six-carbon block polyamide, alone or in combination.

13. The tube of claim 1 in which the thermoplastic contains as a major constituent polyvinylidine fluoride, polyvinylfluoride, polychlorotrifluoroethylene, or ethylene tetrafluoroethylene copolymer, alone or in combination.

14. A filler neck comprising:
   an elongated generally cylindrical filler tube; and
   a connector for attaching an end of the filler tube to a fuel tank, the filler tube comprising:
      a generally cylindrical wall having an outer surface and an inner surface, the inner surface approximately parallel to the outer surface and defining a generally cylindrical interior having a diameter D, the cylindrical interior extending longitudinally through the tube coaxial to a longitudinal axis;
      a first longitudinal segment in which D is approximately constant along the longitudinal axis; and
      a second longitudinal segment in which D varies with position along the longitudinal axis and is at most between about 20% and about 300% greater than the value of D in the first longitudinal segment, the variation of D defining a convolution for facilitating bending of the filler tube, the cylindrical wall of the multiple-layer tube further comprising:
         an outer layer comprised of a thermoplastic elastomer; and
         an inner layer comprised of an extrudable melt-processible thermoplastic having an elongation of at least 150%;
         wherein the outer layer and the inner layer are in non-adhesive contact.

15. The tube of claim 14 in which the inner layer further comprises a conductive material in an amount sufficient to provide an electrostatic dissipation capacity between about $10^4$ to $10^9$ Ohm/cm$^2$, wherein the conductive material is elemental carbon, copper, silver, gold, nickel, or silicon, alone or in combination.

16. The tube of claim 15 wherein the conductive material is present in an amount less than about 5% by volume of the inner layer.

17. The tube of claim 15 wherein the conductive material is dispersed in the inner layer.

18. The tube of claim 14 wherein the thermoplastic elastomer is a polyurethane, polyester copolymer, styrene copolymer, olefinic thermoplastic elastomer, a melt processible rubber or a thermoplastic vulcanizate, alone or in combination.

19. The tube of claim 18 wherein the thermoplastic vulcanizate is crosslinked EPDM rubber dispersed in polypropylene.

20. The tube of claim 14 wherein the thermoplastic is a twelve-carbon block polyamide, an eleven-carbon block polyamide, or a six-carbon block polyamide, alone or in combination.

21. The tube of claim 14 in which the thermoplastic contains as a major constituent polyvinylidine fluoride, polyvinylfluoride, polychlorotrifluoroethylene, or ethylene tetrafluoroethylene copolymer, alone or in combination.

22. A filler neck comprising:

an elongated generally cylindrical filler tube; and a connector for attaching an end of the filler tube to a fuel tank, the filler tube comprising:

a generally cylindrical wall having an outer surface and an inner surface, the inner surface approximately parallel to the outer surface and defining a generally cylindrical interior having a diameter D, the cylindrical interior extending longitudinally through the tube coaxial to a longitudinal axis;

a first longitudinal segment in which D is approximately constant along the longitudinal axis; and a second longitudinal segment in which D varies with position along the longitudinal axis and is at most between about 20% and about 300% greater than the value of D in the first longitudinal segment, the variation of D defining a convolution for facilitating bending of the filler tube, the cylindrical wall of the multiple-layer tube further comprising:

an outer layer comprised of a crosslinked EPDM rubber dispersed in polypropylene; and an inner layer comprised of an extrudable melt-processible thermoplastic, wherein the thermoplastic is a twelve-carbon block polyamide, an eleven-carbon block polyamide, or a six-carbon block polyamide, alone or in combination;

wherein the outer layer and the inner layer are in non-adhesive contact.

23. The tube of claim 22 in which the inner layer further comprises a conductive material in an amount sufficient to provide an electrostatic dissipation capacity between about $10^4$ to $10^9$ Ohm/cm$^2$, wherein the conductive material is elemental carbon, copper, silver, gold, nickel, or silicon, alone or in combination.

24. The tube of claim 23 wherein the conductive material is present in an amount less than about 5% by volume of the inner layer.

25. The tube of claim 23 wherein the conductive material is dispersed in the inner layer.

* * * * *